Figure 1:
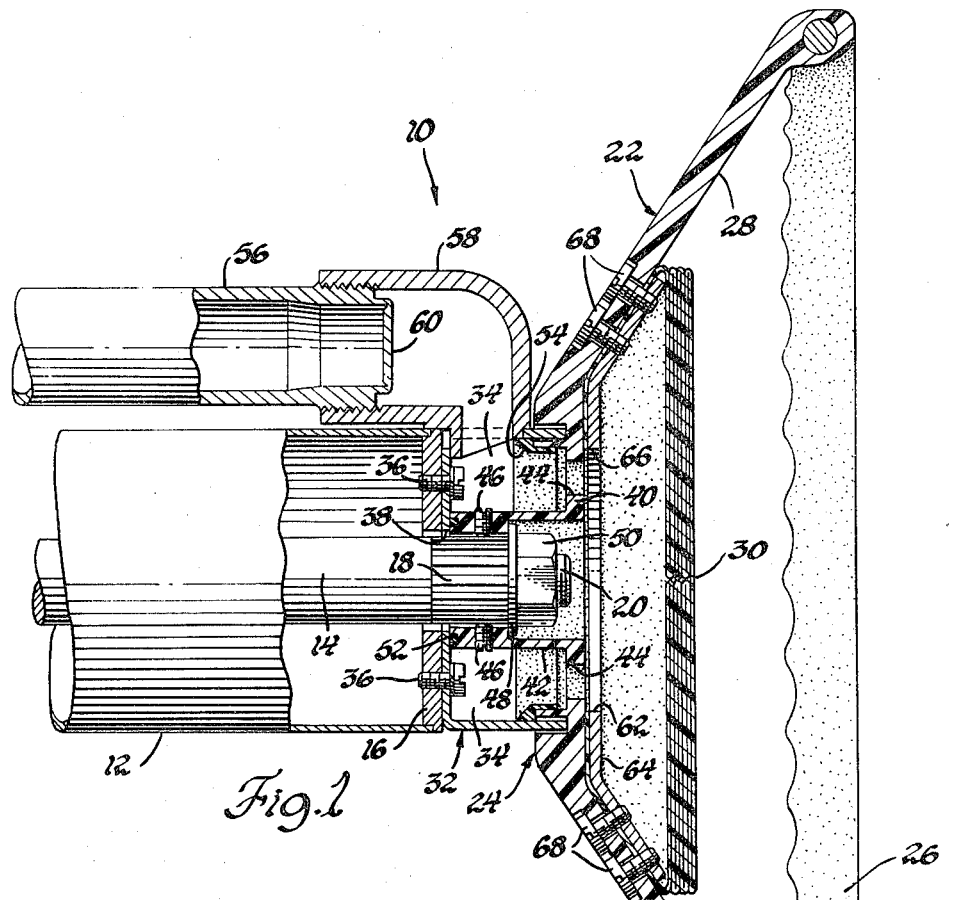

United States Patent

Stephenson

[15] 3,680,884
[45] Aug. 1, 1972

[54] VEHICLE SAFETY ASSEMBLY

[72] Inventor: Robert L. Stephenson, Sterling Heights, Mich.

[73] Assignee: Allied Chemical Corporation, New York, N.Y.

[22] Filed: Oct. 21, 1970

[21] Appl. No.: 82,562

[52] U.S. Cl. .......................... 280/150 AB, 280/87 R
[51] Int. Cl. ............................................. B60r 21/08
[58] Field of Search .......... 280/150 AB, 150 B, 87 R

[56] References Cited

UNITED STATES PATENTS

| | | | |
|---|---|---|---|
| 3,580,603 | 5/1971 | Chute et al. | 280/150 |
| 3,532,360 | 10/1910 | Leising et al. | 280/150 |
| 3,197,234 | 7/1965 | Bertrand | 280/150 |
| 3,600,003 | 8/1971 | Carey | 280/150 |
| 3,506,281 | 4/1970 | Berryman | 280/150 |

*Primary Examiner*—Kenneth H. Betts
*Attorney*—Jonathan Plaut

[57] ABSTRACT

A vehicle safety assembly adapted for connection to a conventional steering column which includes a housing surrounding a steering shaft. The assembly includes a steering wheel which is splined for connection to the steering shaft with a hub portion having a plurality of holes therein communicating with the interior of an inflatable bag which is held in sealing engagement with the steering wheel. A cup-shaped member is connected to the housing of the steering column and defines an annular chamber in sealing engagement with the steering wheel. A conduit is in communication with the cup-shaped member at one end and with a source of pressurized fluid at the other end whereby the bag may be inflated during crash or collision conditions. The system is adapted for connection to conventional steering columns presently utilized in automobiles.

3 Claims, 2 Drawing Figures

PATENTED AUG 1 1972

3,680,884

INVENTOR.
Robert L. Stephenson
BY
Barnard, McGlynn & Reising
ATTORNEYS.

VEHICLE SAFETY ASSEMBLY

This invention relates to a vehicle safety assembly, and more specifically to a vehicle safety assembly including an inflatable means for protecting or limiting the movement of an occupant of a vehicle during crash or collision conditions.

A great deal of effort has been expended to develop vehicle safety assemblies utilizing inflatable bags or confinements which are automatically inflated in response to a predetermined condition of the vehicle to prevent an occupant of the vehicle from contacting the various components of the vehicle. In other words, the bag is inflated during a crash to prevent the occupant of a vehicle from incurring serious injuries as a result of impact with the interior of the vehicle body.

Particular problems have been presented in designing such a vehicle safety assembly which is compatible with the steering column and steering wheel in automobiles. Broadly, the steering wheel and steering column are obstacles to the inflation of the bag. To overcome this, various systems have been developed whereby the inflatable bag is placed within the periphery of the steering wheel. The major problem with the prior art assemblies is that the steering column itself must be of a special design to accommodate the assembly. Another problem is that the prior art assemblies occupy an inordinate amount of space within the periphery of the steering wheel.

Accordingly, it is an object and feature of this invention to provide an improved safety assembly which includes a steering wheel and inflatable means which is adapted for connection to a conventional steering column of the type now utilized in automobiles.

In correlation with the foregoing object and feature, it is another object and feature of this invention to provide such an assembly including a steering wheel and an inflatable means supported by the steering wheel with a chamber means defining an annular chamber adapted for connection to a steering column with the steering wheel so that the annular chamber is disposed about the axis of the steering shaft and including a source of fluid pressure in communication with the annular chamber for inflating the inflatable means.

Figure 2:
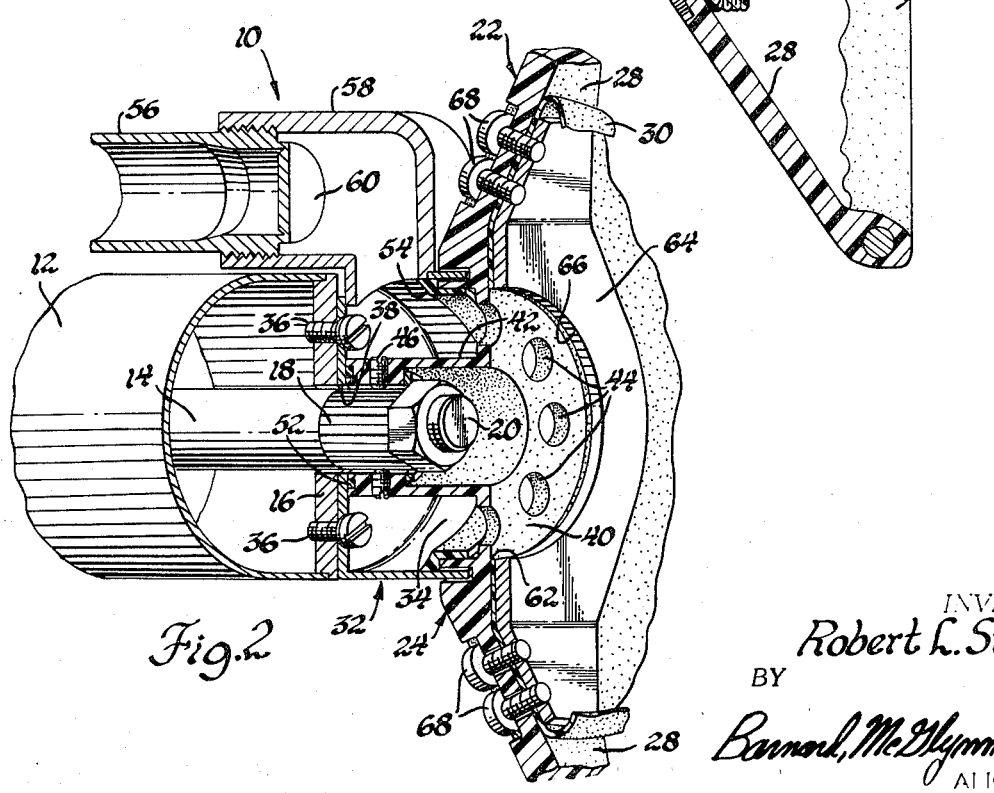

Other objects and attendant advantages of the present invention will be readily appreciated as the same becomes better understood by reference to the following detailed description when considered in connection with the accompanying drawings wherein:

FIG. 1 is a fragmentary cross sectional view of a preferred embodiment of the present invention; and FIG. 2 is a fragmentary perspective view partially broken away and in cross section of a preferred embodiment of FIG. 1.

Referring now to the drawings wherein like numerals indicate like or corresponding parts throughout the several views, a vehicle safety assembly constructed in accordance with the instant invention is generally shown at 10. The vehicle safety assembly 10 is adapted for connection to a steering column having a tubular housing 12 surrounding a steering shaft 14. A cover plate 16 is welded or otherwise secured to the tubular housing 12 and surrounds the steering shaft 14. The steering shaft 14 is splined at 18 and has a threaded end portion 20.

The assembly 10 includes a steering wheel generally indicated at 22 which is adapted for connection to the steering shaft 14 for rotating the latter. The steering wheel 22 includes a hub, generally indicated at 24, an outer ring 26 and a plurality of spokes 28 which extend between the hub 24 and the outer ring 26.

The assembly 10 also includes an inflatable means defined by an inflatable bag 30 supported by the steering wheel 22 and having a collapsed position as illustrated and an extended or inflated position (not shown) for engaging an occupant of the vehicle.

The assembly 10 also includes a chamber means defined by the generally cup-shaped member 32 which in turn defines an annular chamber 34. The cup-shaped member 32 is adapted for connection to the steering column along with the steering wheel 26 so that the annular chamber 34 is disposed about the axis of the shaft 14. More specifically, the cup-shaped member 32 is attached directly to the cover plate 16 of the tubular housing 12 by the bolts 36. The cup-shaped member has a hole 38 in the bottom thereof for disposition about the steering shaft 14.

The hub 24 of the steering wheel 22 includes a radial portion 40 and a downwardly extending cylindrical portion 42. There is also included means defined by the plurality of passages or holes 44 which extend through the radial portion 40 of the hub 24 to establish fluid communication between the annular chamber 34 and the inflatable bag 30. The passages or holes 44 are spaced from one another circumferentially about the cylindrical portion 42 of the steering wheel 22.

The cylindrical portion 42 is splined for disposition on the splined steering shaft 14. Set screws 46 also connect the cylindrical portion 42 of the steering 22 to the shaft 14. The cylindrical portion 42 has a shoulder which is engaged by a washer 48 and a nut 50 is threaded into the end 20 of the shaft 14 to hold the steering wheel 22 to the shaft 14.

The assembly 10 also includes rotary pressure sealing means defined by the seals 52 and 54 between the steering wheel 22 and the cup-shaped member 32 for allowing rotary movement of the steering wheel 22 relative to the cup-shaped member 32. The seal 52 is disposed between the bottom of the cylindrical portion 34 and the bottom of the cup-shaped member 32. The seal 54 is disposed between the upper extremity of the walls of the cup-shaped member 32 and the hub portion 24 of the steering wheel 22. The seal 54 is of the self-sealing type in that it seals in response to pressure being applied thereto. In other words, seal 54 is a lip seal.

The assembly 10 also includes a source of pressurized fluid for providing fluid or compressed gases to the annular chamber 34. The source of fluid includes a conduit 56 which is threadedly connected to an elbow 58 and the elbow 58 is in fluid communication with the chamber 34. The conduit 56 extends along the tubular housing 12 of the steering column. The conduit 56 may contain pressurized fluid or be attached to a means for generating pressurized fluid. There is also included a rupturable means defined by the disc 60 attached to the end of the conduit 56. The disc 60 has a weakened portion or groove about its circumference and ruptures or separates from the conduit 56 upon a sudden rise in pressure within the conduit 56. The rise in pressure may be accomplished as a gas generation device supplies fluid pressure to the conduit 56 or by an explosive device which may be utilized to rupture the disk 60.

The bag 30 is generally closed except for an opening 62 therein which is disposed about the radial portion 40 of the hub 24. A plate 64 is disposed within the bag 30 and has an opening 66 contiguous with the opening 62 in the bag 30. Means comprising the bolts 68 secure the plate 64 to the spokes 28 of the steering wheel to clamp the bag 30 in sealing relationship with the hub portion 24 of the steering wheel 22.

As will be appreciated from the foregoing description, in a crash or collision condition, gases under pressure are supplied from the conduit 56 through the elbow 58 into the chamber 34 and through the passages or holes 44 to inflate the bag 30. It will also be appreciated that the assembly as disclosed may be mounted on a conventional steering column which includes a conventional housing 12 and steering shaft 14, such being facilitated by the components and their relationship to one another. Further, it will be noted that the bag 30 occupies a very minimal space within the periphery of the ring 26 of the steering wheel 22.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, the invention may be practiced otherwise than as specifically described.

The embodiments of the invention in which an exclusive property or privilege is claimed are defined as follows:

1. A vehicle safety assembly adapted for connection to a steering column having a housing surrounding a steering shaft, said assembly comprising: a steering wheel adapted for connection to the shaft for rotating the latter, said steering wheel adapted for disposition on said steering shaft and including a hub, an outer ring and a plurality of spokes extending therebetween, inflatable bag means supported by said steering wheel by connection to at least one of the spokes thereof, and having a collapsed position and an extended position for engaging an occupant of the vehicle, chamber means defining an annular chamber and adapted for connection to the steering column within said wheel so that said annular chamber is disposed about the axis of the shaft, said chamber means adapted for attachment directly to the housing of said steering column, rotary pressure sealing means between said steering wheel and said chamber means for allowing rotary movement of said steering wheel relative to said chamber means while preventing fluid leakage from said chamber, and means establishing fluid communication between said chamber and said inflatable means, said hub having at least one passage therethrough and in communication with said chamber, said inflatable bag means is in sealing relationship with said hub about said passage therein, a source of pressurized fluid for providing fluid to said chamber, a rupturable means disposed in the fluid path between said source of fluid and said bag means, said source of fluid including a conduit extending from said chamber and adapted to extend along the housing of the steering column, said chamber means being a generally cup-shaped member having a hole in the bottom thereof for disposition about the steering shaft, said hub including a radial portion and a downwardly extending cylindrical portion, said sealing means including a seal between the bottom of said cylindrical portion and said cup-shaped member, and a seal between the upper extremity of said cup-shaped member and said hub, said bag means having an opening therein disposed about said radial portion of said hub, and a plate disposed within said bag means and having an opening therein about said radial portion of said hub, and means securing said plate to said steering wheel for maintaining said bag means in sealing relationship with said steering wheel.

2. An assembly as set forth in claim 1, wherein said radial portion of said hub includes a plurality of said passages therethrough and spaced about said cylindrical portion.

3. An assembly as set forth in claim 2, wherein said cylindrical portion is splined for disposition on a splined steering shaft.

* * * * *